INVENTORS
CLARENCE NOEL CAHUSAC
AND FRANK B. ALLEN
BY
Edward T. Connors
ATTORNEY.

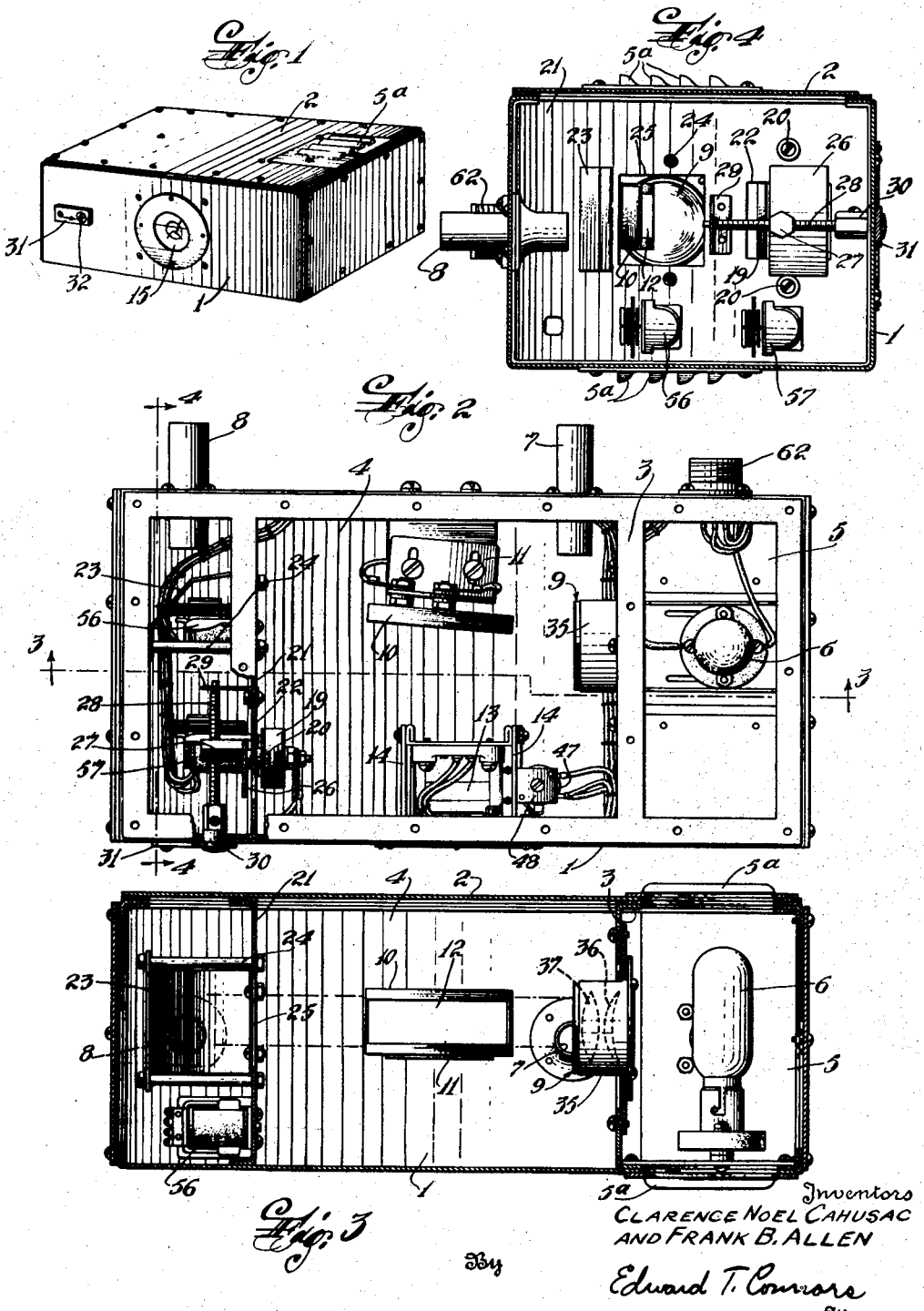

July 22, 1952 C. N. CAHUSAC ET AL 2,604,597
SMOKE DETECTOR
Filed Feb. 3, 1949 3 Sheets-Sheet 3

INVENTORS
CLARENCE NOEL CAHUSAC
AND FRANK B. ALLEN
BY Edward T. Connors
ATTORNEY.

Patented July 22, 1952

2,604,597

UNITED STATES PATENT OFFICE 2,604,597

SMOKE DETECTOR

Clarence Noel Cahusac, Newark, and Frank B. Allen, Towaco, N. J., assignors to C-O-Two Fire Equipment Company, Newark, N. J., a corporation of Delaware Application February 3, 1949, Serial No. 74,341

12 Claims. (Cl. 250—218)

1

This invention relates to smoke detecting apparatus particularly suitable for use on a vehicle such as an airplane. The apparatus is adapted to be placed in a compartment of the airplane to test the air therein for smoke and may be connected to an indicating and signaling device on the instrument board of the airplane to warn the pilot of the presence of the smoke.

This application is a continuation-in-part of our copending application Serial No. 604,892, filed July 13, 1945, now Patent No. 2,464,211.

The present apparatus is generally of the type and an improvement over the apparatus disclosed in United States Letters Patent No. 2,301,367, dated November 10, 1942. That patent shows means for producing a beam of light, means for conducting air to be tested for smoke into the beam of light and a pair of photoelectric elements responsive to the effect of smoke in the beam of light. The photoelectric elements are connected in opposed relationship in an electrical circuit with a sensitive relay adapted to control the production of a visible or audible signal.

In the apparatus disclosed in the patent numbered 2,301,367, one of the photoelectric elements is positioned so as to be responsive to light reflected from particles of smoke in the air stream, while the other photoelectric element is positioned directly in the beam of light. Means are provided for varying the exposure to the light of the second photoelectric element so that the effect of stray rays of light on the first photoelectric element may be balanced. This arrangement makes unnecessary the use of a voltage regulating source for the light source because the balance of the photoelectric element circuit is maintained regardless of the intensity of the light source.

It has been found during the use of the prior apparatus that when the light source is of high candle power, or subject to large variations in intensity, some difficulty has been had in maintaining the photoelectric elements in balance. It is believed that the intense light on one of the elements causes it to "age" more rapidly than the other element resulting in the unbalance.

The present invention aims to overcome the foregoing difficulty and disadvantage by providing a novel and improved construction wherein balance is maintained in the photoelectric circuit even when high intensity light is used in the smoke compartment and when there are large fluctuations in the intensity of this light.

Another object of the present invention is to provide means to pass a beam of light of low intensity practically covering the entire area of the photoelectric element.

These objects are accomplished by providing means whereby light of reduced density is reflected over practically the entire surface of the balancing photoelectric element and the balancing adjustment is made by varying the intensity of the reflected light on the surface of the balancing element rather than by varying the area of the element exposed to the light.

Other objects and advantages of the invention will be apparent from the following description and from the accompanying drawings which show, by way of examples, embodiments of the invention.

In the drawings:

Figure 1 is a perspective view of a smoke detector incorporating our invention.

Figure 2 is an enlarged top view of the smoke detector with the cover plate removed for clearness in illustration.

Figure 3 is a vertical longitudinal sectional view on the line 3—3 of Figure 2.

Figure 4 is a transverse vertical sectional view on the line 4—4 of Figure 2.

Figure 5:
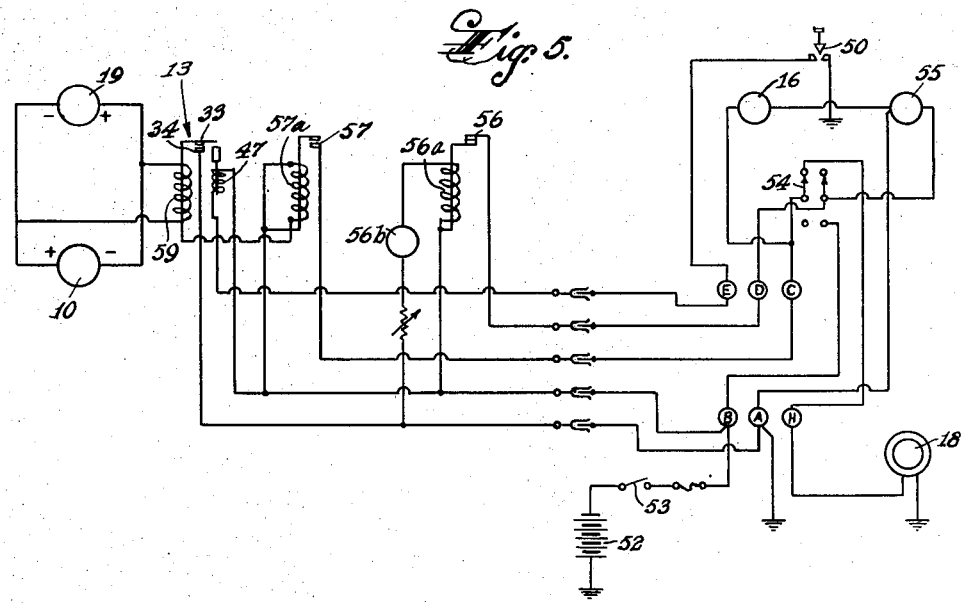
Figure 5 is a wiring diagram of the detector and signalling circuit.

As shown, the smoke detector includes a detecting unit which comprises a casing 1 preferably having at least a removable top wall 2 and also having a partition 3 which divides the casing into a smoke compartment 4 and a compartment 5 for a light source 6 such as an incandescent lamp, the compartment 5 having openings or louvers 5A for the passage of cooling air through the light compartment 4. The smoke compartment has a smoke inlet 7 and a smoke outlet 8. In the partition 3 is a lens system 9 through which light rays from the lamp 6 are directed into and longitudinally of the compartment 4 so that the light rays, represented by the broken lines, are projected in a parallel beam through the compartment 4.

At least one photoelectric element 10 is adjustably mounted on a bracket 11 within the compartment 4 at one side of the light beam so as to be sensitive to light rays reflected from the suspended matter in the stream of fluid entering the casing through the inlet 2. This photoelectric element may be of any suitable type, such as the current generating barrier layer type, and preferably has a large flat rectangular exposed light sensitive surface 12, which is capable of generating sufficient current to operate a sensitive relay without amplification of the electricity. Preferably the light sensitive surface is exposed in close proximity to the outer boundaries of the light beam and is tilted obliquely with respect to the light beam so that said surface is inclined away from the light source as shown in Figure 2. Great sensitivity is thus obtained and at the same time the effect of stray light rays is substantially reduced when no smoke is present in the compartment.

The photoelectric element 10 is connected in circuit with any suitable electrical responsive device, for example a micro-ammeter or, as shown, a sensitive relay 13 which may be mounted by a frame 14 on the front wall of the casing with its dial or face exposed through a window 15 in said casing wall. The sensitive relay 13 controls another circuit which may include any desired electrically operated device such as a signal lamp 16 which may be remotely located, or a howler or audible signal 18 which also may be located at any suitable point. The circuit for connecting the sensitive relay in circuit with a source of electricity, the signals and the photoelectric elements is shown in Figure 5 and will be later described.

Another photoelectric element 19 which may be of the same general type as the element 10 is mounted by bolts 20 on a transverse partition 21 on the casing with its rear side directed toward the light source. The front or light sensitive surface of the photoelectric element 19 is juxtaposed to an opening 22 in the partition 21 so as to be subject to light rays projected through the opening 22 from a reflector 23 which is mounted by bolts 24 on said partition 21 and is juxtaposed to an opening 25 in said partition at the side of the latter opposite the photoelectric element 19. It will be observed that the light rays from the lens 9 may pass through the opening 25, impinge upon the reflector 23 and be directed thereby through the opening 22 on the light sensitive surface of the photoelectric element 19.

In order to vary the extent of exposure of the photoelectric element 19 to the reflected light rays, the reflector 23 is made with a coefficient of reflection so that only a portion of the light received by the reflector is transmitted to the photoelectric element 19. The coefficient of reflection of the reflector 23 may be varied by choosing its material such that the reflector has low reflecting power. Alternatively, the usual coated glass reflector may be used in which the glass is colored, frosted, coated or otherwise treated to reduce its coefficient of reflection. It has been found that when the lamp 6 produces an intense light, it is preferable that the reflector 23 have a comparatively low coefficient of reflection, particularly when the photoelectric elements 10 and 19 have approximately the same output. By providing the reflector 23 of the low reflection coefficient, it is possible to expose practically the entire surface of the balancing photoelectric element to the reflected light without causing the generation of an excessive current by the balancing photoelectric element.

In order to provide a fine adjustment of the light transmitted to the photoelectric element 19, a shutter or baffle plate 26 extends across the opening 22 and has connected thereto a nut 27 through which is threaded a screw 28 one end of which is rotatably mounted in a bracket 29 on the partition 21, while its other end is connected to an adjusting head 30 which is rotatably mounted in a plate 31 on the front wall of the casing 1 and provided with suitable means for rotating it such as kerfs 32 for a screw driver.

The photoelectric element 19 is connected in circuit with the photoelectric element 10 and the sensitive relay 13 in what is known as an "opposed parallel" arrangement or so that the photoelectric effects of said elements are caused to operate in compensating, differential or opposing relation; in other words, the electrodes of the element 19 are connected respectively to the opposite electrodes of the element 10 (see Figure 5).

With this construction, initially the photoelectric element circuit is so adjusted that the relay 13 or other device will assume a normal condition, for example to open the signal circuit, when no smoke is present in the casing 1 and when smoke or other fluid containing suspended matter is caused to flow through the casing into the beam of light, some of the light rays will be reflected from the solid particles in the stream upon the photoelectric element 10 whereupon the relay or other device 13 will be actuated by the current in the photoelectric element circuit, for example to close the signal circuit. In this connection it may be well to point out that the relay 13 has a pointer or swingable contact arm 33 which is responsive to current in the photoelectric element circuit and normally is spaced from the fixed contact 34 but is actuated into engagement with said contact when the photoelectric element circuit is energized.

It will be observed that the element 10 will be continuously somewhat affected by stray light rays from the beam even when no smoke is present in the compartment 4, and the element will be further affected by slight variations in the intensity or candle power of the light source 6, which without some means to prevent it will result in irregular or unsteady operation of the sensitive relay 13. The principal means of adjusting the balance of the two photoelectric elements is by varying the coefficient of reflection of the reflector 23 by changing reflectors until a rough balance is obtained. A fine adjustment is obtained by rotating the screw 28 so that the shutter 26 is adjusted to vary the amount of light reflected from the reflector 23 through the opening 22 upon the balancing element 19, and thus when no smoke is present in the compartment 4, the effect of the light on the element 10 may be balanced by the effect of the light on the element 19 whereby a steady and normal setting of the sensitive relay pointer 33 may be obtained.

The use of reflected light for energizing the balancing element 19 results in small current generation by that element. This is advantageous where the light is reflected from the suspended particles in the smoke on the main element 10 because under such conditions large variations or fluctuations in the candle power of the light source 6 will not materially affect or disturb the balance of contact arm 33 of the sensitive relay. Therefore, this feature of the invention makes it possible to utilize light sources of higher candle power as automatic compensation is had for large variations in the intensity of the light source.

To obtain a parallel beam of light of maximum diameter consistent with economy in size of light source and the lens, our lens system preferably includes a cylindrical lens holder 35 in which are mounted between the source of light and the element 10 in the order named, a meniscus lens 36 and a convex lens 37. Such a beam of light facilitates generation of adequate current to operate the sensitive relay without current amplification.

The photoelectric elements, light source, sensitive relay and signals may be connected in circuit in different ways but one possible circuit arrangement is shown in Figure 5 of the drawings. The reference character 52 designates a source of electric current one terminal of which is grounded while the other terminal is connected to one terminal of a main circuit switch 53 the other terminal of which is connected to a binding screw B which in turn is connected to one terminal of a double pole toggle switch 54. Another binding screw A constitutes the ground connection for the circuit while a screw H is connected to one terminal of the howler 18, the other terminal of which is grounded, said screw H also being connected to one terminal of the toggle switch 54. There is also a binding screw E for connecting the resetting switch 50 in circuit with the electromagnetic coil 47, a binding screw D for connecting in the circuit a trouble lamp 55 and a normally closed series relay switch 56 which is mounted on the partition 21 of the casing 1; and a binding screw C which connects in circuit a normally open power relay switch 57 also mounted on the partition 21 of the casing. Preferably a photoelectric exciter lamp 56 B is included in the circuit with the coil of the relay 56. The electromagnetic coil 56A for the relay switch 56 is connected to the line circuit through the binding screws A and B while the coil 57A of the relay switch 57 is connected in circuit with and controlled by the sensitive relay switch 33, 34 which in turn is operated by the coil 59 which is connected in circuit with the photoelectric elements 10 and 19.

Figure 6:
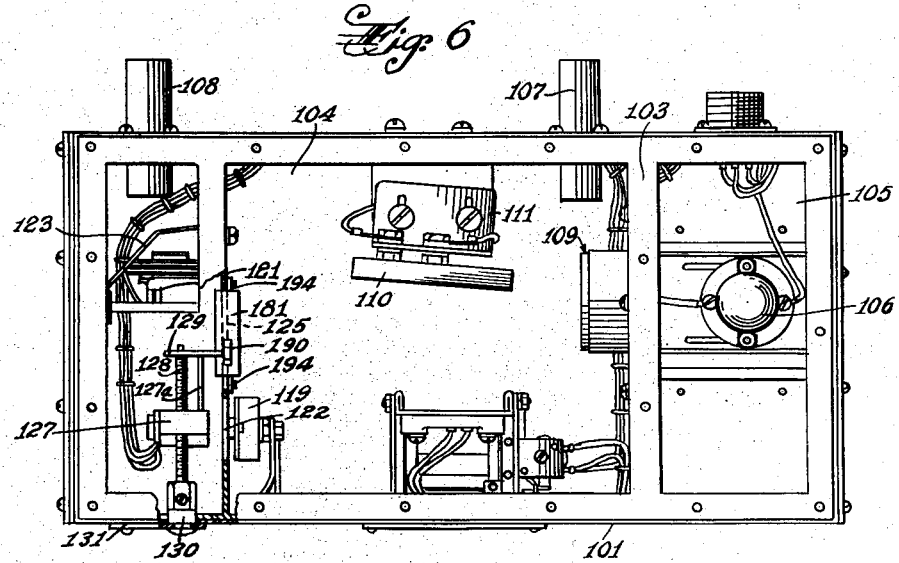
Figure 6 is a view corresponding to Figure 2 but of a modified form of the smoke detector in accordance with the invention in which a light valve, such as a polarized screen is positioned between the reflector and the source of light to vary the intensity of the light transmitted to the balancing photoelectric element.

In Figure 6 another embodiment of the invention is illustrated in which corresponding parts are designated by the same reference numerals as in Figures 1 to 4 with the addition of 100. In Figure 6 there is shown a smoke detector 101 having a removable cover (not shown) and a partition 103 which divides the casing into a smoke compartment 104 and a compartment 105 for a light source 106. The smoke compartment 104 has a smoke inlet 107 and a smoke outlet 108. The partition 103 has a lens system 109 through which light beams from the lamp 106 are directed in parallel beams through the compartment 104.

A photoelectric element 110 is adjustably mounted on a bracket 111 within the compartment 104 at one side of the light beam as in the previous embodiments. Another photoelectric element 119 is mounted on a transverse partition 121 of the casing with its light sensitive surface facing an opening 122 in the partition.

A reflector 123 is positioned so as to receive direct rays from the beam of light projected through the smoke compartment and passing through an opening 125 in the partition 121 so that the light rays from the lens 109 pass through the opening 125 and impinge upon the reflector 123 to be directed through the opening 122 to the sensitive surface of the photoelectric element 119. In this embodiment of the invention further means are provided for varying the light transmitted to the reflector 123 including a light valve 181 having a polarized screen formed of a pair of polarized lenses, one of which is rotatable with respect to the other to vary the amount of light passed through the assembly. The intensity of the light rays from the lens 109 which are passed through the light valve 181 depends upon the position the polarized lenses of the light valve bear with repect to each other and accordingly the light transmitted to the reflector 123 may be varied by changing the relative angular position of the polarized lens.

Figure 8:
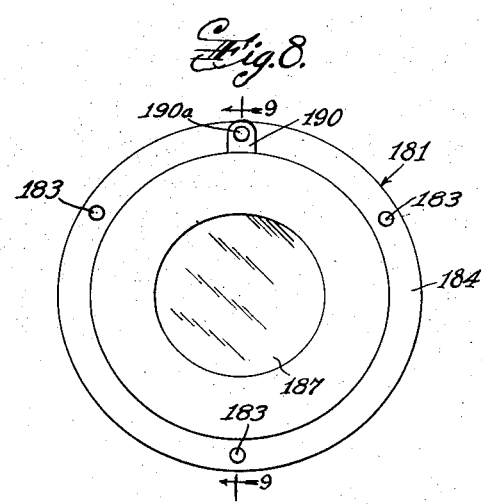
Figure 8 is an elevational view of a light valve including a pair of polarized lens such as used in the smoke detector shown in Figure 6.
Figure 9:
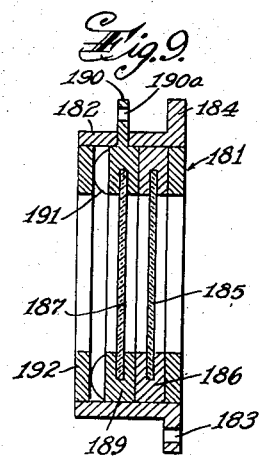
Figure 9 is a vertical sectional view of the light valve shown in Figure 8 and taken along the line 9—9 thereof.

The light valve 181 (Figures 8 and 9) includes a tubular casing 182 having a mounting flange 184 apertured as indicated at 183 to receive mounting screws. A polarized glass lens 185 is fixedly mounted in the casing by a supporting ring 186. A second polarized lens 187 is rotatably mounted in the casing by its supporting ring 189 having extending therefrom an opening 190a in operating arm 190. A spring ring 191 bearing between a cap 192 and the supporting ring 189. The light valve assembly 181 is supported in the partition 121 over the opening 125 by mounting bolts 194 extending through matching holes in the partition and the apertures in the mounting flange 184.

In order to rotate one of the polarized lens with respect to the other, the operating arm 190 has rod 127a movable by a nut 127 attached to it to be engaged by a screw 128 for movement of the operating member by the rotation of the screw. A bracket 129 rotatably supports the screw on the partition 121 while the other end of the screw is connected to an adjustment head 130 rotatably mounted in a plate 131 on the front wall of the casing of the smoke detector. In this embodiment of the invention an adjustment of the output of the photoelectric elements 110 and 119 is obtained by turning the adjusting screw 128 to vary the respective positions of the polarized lens. This embodiment of the invention is advantageous in that a considerable latitude of adjustment may be made by carrying the relative positions of the polarized lens.

Figure 7:
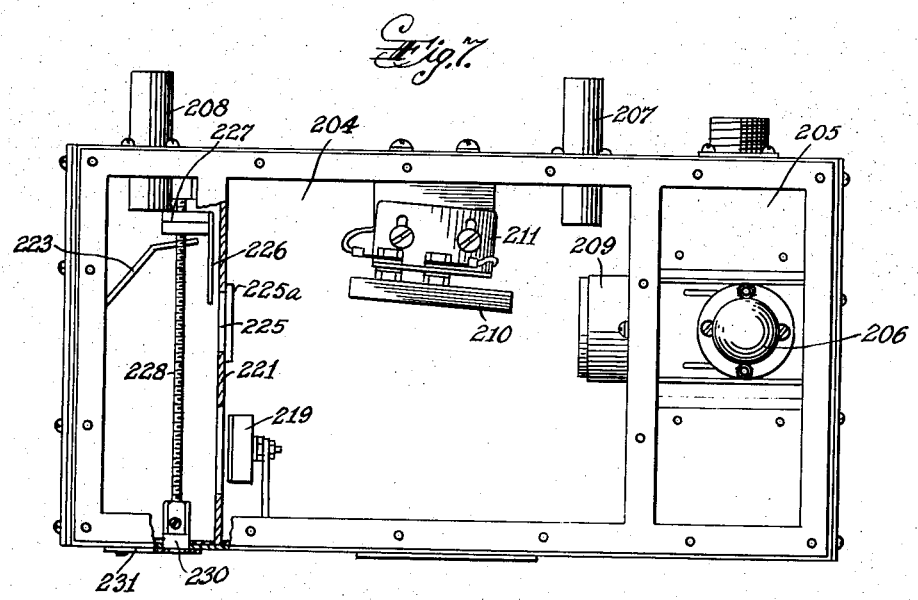
Figure 7 is a view corresponding to Figure 2 but of a modified form of the smoke detector in accordance with the invention in which an adjustable shutter is positioned in front of a window to vary the intensity of the light to the reflector to be reflected to the balancing photoelectric element.

In Figure 7 another embodiment of the invention is illustrated in which corresponding parts are designated by the same reference numerals as in Figures 1 to 4 with the addition of 200. In Figure 7 there is shown a smoke detector generally as previously described and differing therefrom primarily in that the means for varying the reflected light to the balancing photoelectric element comprises an apertured partition with means to decrease the size of the aperture in the partition so as to reduce the amount of light impinging on the reflector and thereby reducing the amount of light reflected to the balancing photoelectric element.

In Figure 7 the partition 221 has an opening 225 so that the light rays from the lens means 209 may pass therethrough and impinge upon the reflector 223. In order to limit the amount of light passing through the opening 225 is closed by either a transparent or translucent window 225a which may be chosen with a light transmitting quality such as to allow a predetermined intensity of light to impinge on the reflector 223. A shutter or baffle plate 226 slidably extends across the opening 225 and has attached thereto a nut 227 through which is threaded a screw 228 rotatably mounted as previously described. In this embodiment, by turning the adjusting head 230 the shutter 226 is slidably moved so as to vary the size of the opening 225 to provide a fine adjustment of the light transmitted to the reflector 223, which, in turn, is reflected to the balancing photoelectric element 219 as previously described in connection with the descriptions for the other embodiments.

Alternatively, in this embodiment a certain amount of adjustment of the reflected light may be had by choosing a reflector of a desired coefficient of reflection so that the reflected light may be decreased by this means as well as by reducing the size of the opening 225.

It will be understood that in each of the embodiments a suction pump may be attached to the smoke outlet to draw the smoke through the smoke compartment. Alternatively, a blower may be attached to the inlet, or other conventional means used to draw or force the smoke through the smoke compartment.

While the invention has been described and illustrated with respect to specific embodiments thereof, it will be understood that other embodiments may be resorted to without departing from the invention. For example, the balancing of the photoelectric elements may be provided for in other ways, such as by forming the reflector area of a size so that the amount of light reflected therefrom to the photoelectric element is varied. Furthermore, the reflector may be dispensed with and the unpainted metal surface of the inside of the casing may be used as a reflector. In this event, the size of the reflecting surface may be predetermined by applying light absorbing paint to the interior of the casing leaving an unpainted metal surface of the size desired for the reflector. Therefore, the form of the invention set out above should be considered as illustrative and not as limiting the scope of the following claims.

We claim:

1. Apparatus for detecting suspended matter in a fluid comprising, light source means for producing a beam of light, fluid passage means for conducting a stream of fluid into the light beam, a photoelectric element located at one side of the light beam to receive light rays reflected from suspended matter in the fluid, a second photoelectric element, means connecting the second photoelectric element in a circuit with the first named photoelectric element, electric responsive means in the circuit, reflector means to transmit light from the source to the second photoelectric element, and adjustable means to vary the light to the second photoelectric element.

2. Apparatus for detecting suspended matter in a fluid comprising a casing partitioned to define a compartment for a light source and a smoke compartment, a light source in the light compartment, a lens system for projecting a beam of light from the light source into the smoke compartment, inlet and outlet passages for the smoke compartment for the passage of fluid to be tested, a photoelectric element located at one side of the beam of light to receive light rays reflected from suspended matter in the fluid stream, a second photoelectric element having its sensitive surface away from direct rays of the beam of light, the photoelectric elements connected in an electric circuit so as to oppose each other, electric responsive means also connected in the circuit so as to indicate an unbalance in the outputs of the photoelectric elements, a reflector to reflect light from the source over practically the entire sensitive surface of the second photoelectric element, and an adjustable shutter to vary the light to the second photoelectric element.

3. Apparatus for detecting suspended matter in a fluid comprising, light source means for producing a beam of light, fluid passage means for conducting a stream of fluid into the light beam, a photoelectric element located at one side of the light beam to receive light rays reflected from suspended matter in the fluid, a second photoelectric element, reflector means to transmit light from the source to the second photoelectric element, means connecting the second photoelectric element in a circuit with the first named photoelectric element, electric responsive means in the circuit, and means to vary the light to the reflector means.

4. Apparatus for detecting suspended matter in a fluid comprising, light source means for producing a beam of light, fluid passage means for conducting a stream of fluid into the light beam, a photoelectric element located at one side of the light beam to receive light rays reflected from suspended matter in the fluid, a second photoelectric element, reflector means to transmit light from the source to the second photoelectric element, means connecting the second photoelectric element in a circuit with the first named photoelectric element, electric responsive means in the circuit, and a polarized screen to transmit a reduced amount of light from the source to the reflector means to be reflected to the second photoelectric element.

5. Apparatus for detecting suspended matter in a fluid comprising a casing partitioned to define a compartment for a light source and a smoke compartment, a light source in the light compartment, a lens system for projecting a beam of light from the light source into the smoke compartment, inlet and outlet passages for the smoke compartment for the passage of fluid to be tested, a photoelectric element located at one side of the beam of light to receive light rays reflected from suspended matter in the fluid stream, a second photoelectric element having its sensitive surface away from direct rays of the beam of light, the photoelectric elements connected in an electric circuit so as to oppose each other, electric responsive means also connected in the circuit so as to indicate an unbalance in the outputs of the photoelectric elements, a reflector to reflect light from the source over practically the entire sensitive surface of the second photoelectric element, and an adjustable shutter to vary the light to the reflector.

6. Apparatus for detecting suspended matter in a fluid comprising a casing partitioned to define a compartment for a light source and a smoke compartment, a light source in the light compartment, a lens system for projecting a beam of light from the light source into the smoke compartment, inlet and outlet passages for the smoke compartment for the passage of fluid to be tested, a photoelectric element located at one side of the beam of light to receive light rays reflected from suspended matter in the fluid stream, a second photoelectric element having its sensitive surface away from direct rays of the beam of light, the photoelectric elements connected in an electric circuit so as to oppose each other, electric responsive means also connected in the circuit so as to indicate an unbalance in the outputs of the photoelectric elements, a reflector to reflect light from the source over practically the entire sensitive surface of the second photoelectric element, and a polarized screen positioned between the source of light and the reflector to vary the light to the second photoelectric element.

7. Apparatus for detecting suspended matter in a fluid comprising a casing partitioned to define a compartment for a light source and a smoke compartment, a light source in the light compartment, a lens system for projecting a beam of light from the light source into the smoke compartment, inlet and outlet passages for the smoke compartment for the passage of fluid to be tested, a photoelectric element located at one side of the beam of light to receive light rays reflected from suspended matter in the fluid stream, a second photoelectric element having its sensitive surface away from direct rays of the beam of light, the photoelectric elements connected in an electric circuit so as to oppose each other, electric responsive means also connected in the circuit so as to indicate an unbalance in the outputs of the photoelectric elements, a reflector to reflect light from the source over practically the entire sensitive surface of the second photoelectric element, and a translucent window positioned between the source of light and the reflector to vary the light to the second photoelectric element.

8. Apparatus for detecting suspended matter in a fluid comprising a casing partitioned to define a compartment for a light source and a smoke compartment, a light source in the light compartment, a lens system for projecting a beam of light from the light source into the smoke compartment, inlet and outlet passages for the smoke compartment for the passage of fluid to be tested, a photoelectric element located at one side of the beam of light to receive light rays reflected from suspended matter in the fluid stream, a second photoelectric element having its sensitive surface away from direct rays of the beam of light, the photoelectric elements connected in an electric circuit so as to oppose each other, electric responsive means also connected in the circuit so as to indicate an unbalance in the outputs of the photoelectric elements, a reflector to reflect light from the source over practically the entire sensitive surface of the second photoelectric element, a translucent window positioned between the source of light and the reflector to vary the light to the second photoelectric element, and an adjustable shutter to vary the light to the reflector.

9. Apparatus for detecting suspended matter in a fluid, comprising a casing having a light compartment and a detecting compartment separated by a partition, lens means in the partition for passing a beam of light from the light compartment through the detecting compartment, means for conducting the fluid into the detecting compartment, a photoelectric element located with its light sensitive surface facing away from the lens means to avoid direct rays of light, the photoelectric element adapted to receive light rays reflected from suspended matter in the fluid, a second photoelectric element located with its sensitive surface facing away from the lens means to avoid direct rays of light and adapted to receive light from the source reflected thereon, an electrical responsive device, the photoelectric elements connected in opposition with each other and to the electrical responsive device for the actuation thereof, and a baffle plate slideably overlying the light sensitive surface of the second photoelectric element, nut and screw means to slideably actuate the baffle plate.

10. Apparatus for detecting suspended matter in a fluid, comprising a casing having a light compartment and a detecting compartment separated by a partition, lens means in the partition for passing a beam of light from the light compartment through the detecting compartment, means for conducting the fluid into the detecting compartment, a photoelectric element located with its light sensitive surface facing away from the lens means to avoid direct rays of light, the photoelectric element adapted to receive light rays reflected from suspended matter in the fluid, a second photoelectric element located with its sensitive surface facing away from the lens means to avoid direct rays of light and adapted to receive light from the source reflected thereon, and an electrical responsive device, the photoelectric elements connected in opposition with each other and to the electrical responsive device for the actuation thereof, the first photoelectric element having its sensitive surface of an elongated rectangular shape with its long dimension extending lengthwise of the light beam.

11. Apparatus for detecting suspended matter in a fluid comprising means including a light source for producing a beam of light, means for conducting the fluid into the light beam, a photoelectric element located with respect to the beam and the fluid stream to receive light rays reflected from suspended matter in the fluid and having an elongated rectangular light-sensitive surface whose longer dimension extends lengthwise of the light beam, a second photoelectric element subject to light from the light source relatively independently of the effect of the stream of fluid, means connecting the photoelectric elements in circuit so that the photoelectric effects of the second element oppose the photoelectric effects of the first named element, and electrical responsive means in the circuit.

12. Apparatus for detecting suspended matter in a fluid, comprising means including a light source for producing a beam of light, means for conducting a stream of fluid into the light beam, a photoelectric element located at one side of the light beam to receive light rays reflected from suspended matter in the fluid stream, a second photoelectric element, means for reflecting upon the second photoelectric element light rays transmitted through the fluid stream, means connecting the photoelectric elements in an electric circuit whereby the photoelectric effects of the second photoelectric element oppose the photoelectric effects of the first photoelectric element, electric responsive means in the circuit, and means for at will varying the extent of exposure of the second photoelectric element to the reflected light rays including a baffle plate between the reflector and the sensitive surface of the photoelectric element and movable to vary the extent of exposure of the sensitive surface to the reflected light rays.

CLARENCE NOEL CAHUSAC.
FRANK B. ALLEN.

REFERENCES CITED

The following references are of record in the file of this patent:

UNITED STATES PATENTS

| Number | Name | Date |
| --- | --- | --- |
| 1,828,894 | Freygang | Oct. 27, 1931 |
| 2,215,211 | Devol | Sept. 17, 1940 |
| 2,298,757 | Evans et al. | Oct. 13, 1942 |
| 2,299,529 | Crampton | Oct. 20, 1942 |
| 2,423,322 | Hurley Jr. | July 1, 1947 |
| 2,427,013 | MacAdams | Sept. 9, 1947 |